United States Patent Office 3,171,846
Patented Mar. 2, 1965

3,171,846
PREDNISOLONE-21-DOUBLE ESTERS
Pier Nicola Giraldi and Giuliano Nannini, Milan, Italy, assignors to Carlo Erba S.p.A., Milan, Italy, a corporation of Italy
No Drawing. Filed July 5, 1963, Ser. No. 293,197
Claims priority, application Italy, July 10, 1962, 13,845/62
7 Claims. (Cl. 260—397.45)

This patent relates to the preparation of cortisone derivatives effective by mouth, with high resorption and high constant blood concentrations.

These new drugs afford a more durable and constant action in time, therefore removing the abrupt fluctuations in blood concentration figures, reducing the undesirable drawbacks of cortisone derivatives and affording a less intensive posology at broader intervals.

These derivatives can be obtained by esterification of the cortisone esters in 21 position. E.g. the hydroxyl-group in pos. 21 can be esterified initially with aliphatic hydroxy-acids, and successively the final hydroxy-group can be esterified with aliphatic or aromatic acids substituted or not.

The hydroxy-acid can be e.g. glycolic acid, β-hydroxy-propionic acid etc. The aliphatic acid should preferably be a long-chain one, e.g. oenanthic, palmitic, stearic acids etc., or might be substituted, e.g. morpholinacetic, N-di-methyl-β-amino-propionic acids, etc.

The aromatic acids can be benzoic acid and others.

These substances can be prepared e.g. by reaction of prednisolone-21-chloro-acetate in solvent with the sodic or potassium salt of the corresponding aliphatic or aromatic acid, or by reaction of prednisolone with the chloride of the corresponding acyl-glycolic acid, in presence of a hydrochloric acid acceptor.

As steroid substances are used glyco-corticoids. The hereunder following examples illustrate but do not limit the present invention.

*Example 1*

3 g. (0.0068 m.) prednisolone chloroacetate dissolved in 200 ml. tetrahydrofurane and 10 ml. H$_2$O are added with 2.7 g. (0.0084 m.) K stearate and 0.06 g. NaJ and heated to boiling, under stirring, for 36 h., then evaporated in vacuum to dryness.

The residue is washed with H$_2$O to disappearance of the Cl-ion from the filtrate. Crystallization from diluted alcohol results in prednisolone - 21 - stearoyl-glycolate (M.P. 104–105° C.).

*Example 2*

3.6 g. (0.01 m.) prednisolone and 4.32 g. (0.012 m.) stearoyl-glycolyl-chloride, separately dissolved in dry dioxane, are added with 0.89 ml. (0.011 m.) dry pyridine. The mixture is kept at 60° C. for 20 h., then poured in water-ice and filtered. Crystallization from diluted ethanol results in prednisolone - 21 - stearoyl-glycolate (M.P. 104–105° C.).

With a similar process we have prepared prednisolone-21-oenanthoyl-glycolate, prednisolone-21-caproyl-glycolate, prednisolone-21-palmitoyl-glycolate etc.

*Example 3*

3 g. (0.0068 m.) prednisolone chloroacetate dissolved in 200 ml. tetrahydrofurane and 2 ml. water is added with 1.35 g. (0.0084 m.) K benzoate and 0.06 g. NaJ, heated to boiling, under stirring, for 48 h., evaporated in vacuum to dryness.

The residue is washed with water to disappearance of the Cl-ion from the filtrate. Crystallization from diluted alcohol results in prednisolone - 21 - benzoyl-glycolate (M.P. 116–117° C.).

With a similar process we have prepared prednisolone-21-propionyl-glycolate (M.P. 191° C.).

*Example 4*

3.6 g. (0.01 m.) prednisolone and 2.38 g. (0.012 m.) benzoyl-glycolyl-chloride, separately dissolved in dry dioxane, are added with 0.89 ml. (0.011 m.) dry pyridine.

The mixture is kept at 60° C. for 20 h., then poured into water and ice and filtered. Crystallization from diluted alcohol results in prednisolone - 21 - benzoyl-glycolate (M.P. 116–117° C.).

*Example 5*

4.36 g. (0.01 m.) prednisolone chloroacetate dissolved in 150 ml. N-dimethylformamide and 1.68 g. (0.012 m.) Na-N-dimethyl-β-amino-propionate dissolved in 3 ml. water are mixed and kept at 60° C. for 60 h., then poured in water and extracted with chloroform.

The chloroformic layer, dried on CaCl$_2$, is evaporated in vacuum. The residue is treated with ethanol and precipitated with ethyl-ether. Crystallization from ethanol-ethyl-ether results in prednisolone - 21 - N - dimethyl-β-amino-propionyl-glycolate (M.P. 250° C.).

*Example 6*

3.6 g. (0.01 m.) prednisolone and 2.32 g. (0.012 m.) N - dimethyl - β - amino-propionyl-glycolyl-chloride, separately dissolved in dry dioxane, are added with 0.89 ml. (0.011 m.) dry pyridine. The mixture is kept at 60° C. for 20 h., the dioxane is distilled to a reduced volume, and the product is precipitated with ethyl-ether.

Crystallization from ethanol-ethyl-ether results in pre-dnisolone-21-N-dimethyl - β - amino-propionyl-glycolate (M.P. 250° C.).

We claim:
1. Prednisolone-21-propionyl-glycolate.
2. Prednisolone-21-stearoyl-glycolate.
3. Prednisolone-21-oenanthoyl-glycolate
4. Prednisolone-21-caproyl-glycolate
5. Prednisolone-21-palmitoyl-glycolate
6. Prednisolone-21-benzoyl-glycolate
7. Prednisolone-21-N-dimethyl - β - amino-propionyl-glycolate

References Cited by the Examiner
UNITED STATES PATENTS

| | | | |
|---|---|---|---|
| 2,842,567 | 7/58 | Haack et al. | 260—397.4 |
| 3,059,001 | 10/62 | Haede et al. | 260—397.45 |
| 3,086,011 | 4/63 | Hull | 260—239.5 |

LEWIS GOTTS, *Primary Examiner.*